United States Patent
Foster et al.

(10) Patent No.: US 9,496,571 B2
(45) Date of Patent: Nov. 15, 2016

(54) FUEL CELL SYSTEM

(71) Applicant: INTELLIGENT ENERGY LIMITED, Loughborough, Leicestershire (GB)

(72) Inventors: Simon Edward Foster, Loughborough (GB); Peter David Hood, Loughborough (GB); Christopher James Kirk, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 323 days.

(21) Appl. No.: 14/345,932

(22) PCT Filed: Sep. 21, 2012

(86) PCT No.: PCT/GB2012/052349
§ 371 (c)(1),
(2) Date: Mar. 19, 2014

(87) PCT Pub. No.: WO2013/041883
PCT Pub. Date: Mar. 28, 2013

(65) Prior Publication Data
US 2014/0220466 A1   Aug. 7, 2014

(30) Foreign Application Priority Data

Sep. 23, 2011 (GB) .................................. 1116457.1

(51) Int. Cl.
*H01M 8/04* (2016.01)
*H01M 8/24* (2016.01)
*H01M 8/10* (2016.01)

(52) U.S. Cl.
CPC ..... *H01M 8/04679* (2013.01); *H01M 8/04089* (2013.01); *H01M 8/04201* (2013.01);
(Continued)

(58) Field of Classification Search
CPC .................. H01M 8/04544; H01M 8/04552; H01M 8/04559; H01M 8/04664; H01M 8/04089; H01M 8/04201; H01M 8/04388; H01M 8/04395; H01M 8/04447; H01M 8/2415; H01M 8/2475; H01M 2008/1095; H01M 8/04679; Y02E 60/50
See application file for complete search history.

(56) References Cited

U.S. PATENT DOCUMENTS 5,709,961 A * 1/1998 Cisar .................... C25B 9/066
429/455
6,054,228 A * 4/2000 Cisar .................... C25B 9/066
429/443
(Continued)

FOREIGN PATENT DOCUMENTS

DE  WO 2009127743 A1 * 10/2009 ........ H01M 8/04014
EP         2075866 A1    7/2009
(Continued)

OTHER PUBLICATIONS

UK Intellectual Property Office Search Report for priority application GB 1116457.1 dated Nov. 26, 2011.
(Continued)

*Primary Examiner* — Basia Ridley
*Assistant Examiner* — Heng Chan
(74) *Attorney, Agent, or Firm* — Baker & Hostetler LLP

(57) ABSTRACT

A fuel cell (FC) system operating as its own hydrogen leak detector. The system including at least one cathode and cathode conduit for passage of oxidant to the cathode and a housing containing one or more FCs and defining a plenum around the FC. A ventilation system forces air from the plenum into the cathode conduit and a control system monitors the FC voltage and detects a drop in voltage attributable to hydrogen in the cathode conduit. A control system may include actual cell voltage monitoring of the FC or of one or more cells in the FC stack and a processor for receiving inputs indicative of the operation of the FC or FC stack and/or to determine an expected voltage of FC(s) being monitored and whether the difference between the actual and expected voltage(s) exceeds a predetermined threshold indicative of a predetermined level of hydrogen in the cathode conduit.

20 Claims, 2 Drawing Sheets

Figure 1:
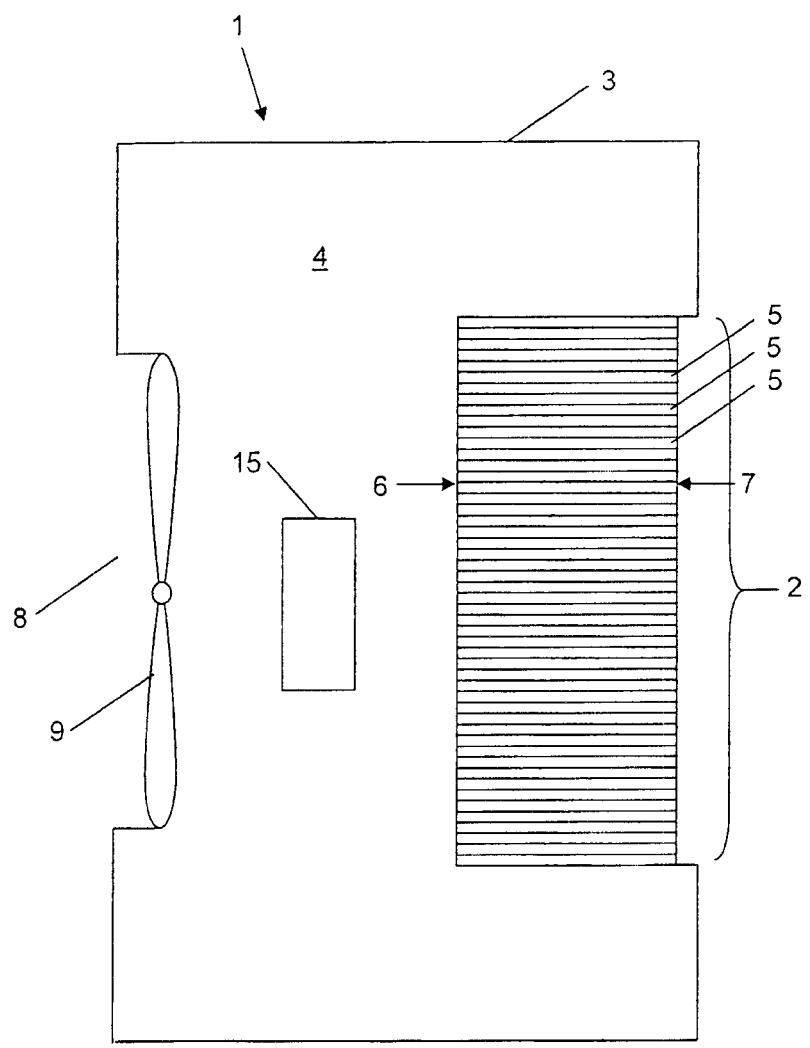

(52) U.S. Cl.
CPC ..... *H01M 8/04388* (2013.01); *H01M 8/04395* (2013.01); *H01M 8/04447* (2013.01); *H01M 8/04559* (2013.01); *H01M 8/2415* (2013.01); *H01M 8/2475* (2013.01); *H01M 2008/1095* (2013.01); *Y02E 60/50* (2013.01)

(56) References Cited

U.S. PATENT DOCUMENTS

| | | | |
|---|---|---|---|
| 6,638,650 | B1 | 10/2003 | Bailey et al. |
| 6,733,913 | B2 * | 5/2004 | Cisar ............. C25B 9/066 204/252 |
| 2003/0022044 | A1 | 1/2003 | Inai et al. |
| 2004/0013913 | A1 | 1/2004 | Fabis et al. |
| 2004/0124843 | A1 | 7/2004 | Hamada et al. |
| 2008/0057367 | A1 * | 3/2008 | Nakakubo ......... H01M 8/04074 429/444 |
| 2009/0169927 | A1 | 7/2009 | Sato et al. |
| 2011/0117470 | A1 * | 5/2011 | Aras ................ H01M 8/04014 429/452 |

FOREIGN PATENT DOCUMENTS

| | | |
|---|---|---|
| EP | 2075866 | 6/2011 |
| EP | 2634851 | 9/2013 |
| EP | 2634851 A1 | 9/2013 |
| JP | 10-081985 A | 3/1998 |
| JP | 2001-216990 A | 8/2001 |
| JP | 2003045466 | 2/2003 |
| JP | 2003045466 A | 2/2003 |
| JP | 2005063724 | 3/2005 |
| JP | 2005063724 A * | 3/2005 |
| JP | 2005063724 A2 | 3/2005 |
| JP | 2005-322579 A | 11/2005 |
| JP | 2007005266 | 1/2007 |
| JP | 2007005266 A | 1/2007 |
| JP | 2007-193963 A | 8/2007 |
| JP | 2008-060044 A | 3/2008 |
| JP | 2008-071642 A | 3/2008 |
| JP | 2009032602 A | 2/2009 |
| JP | 2009231040 | 10/2009 |
| JP | 2009231040 A | 10/2009 |
| JP | 2009238439 | 10/2009 |
| JP | 2009238439 A | 10/2009 |
| JP | 2009032602 | 12/2009 |
| TW | 200836391 A | 9/2008 |
| WO | 02/27832 | 4/2002 |
| WO | 02/27832 A2 | 4/2002 |
| WO | WO 02/27833 A | 4/2002 |
| WO | 2008/038032 | 4/2008 |
| WO | 2008/038032 A2 | 4/2008 |
| WO | 2013041883 A1 | 3/2013 |

OTHER PUBLICATIONS

UK Intellectual Property Office examination report for priority application GB 1116457.1 dated Oct. 16, 2013.
UK Intellectual Property Office examination report for priority application GB 1116457.1 dated Jan. 14, 2014.
Applicants' response to the UK Intellectual Property Office for priority application GB 1116457.1 dated Dec. 12, 2013.
Applicants' response to the UK Intellectual Property Office for priority application GB 1116457.1 dated Feb. 17, 2014.
International search report and written opinion for parent PCT/GB2012/052349 dated Jan. 3, 2013.
Applicants' response to written opinion for parent PCT/GB2012/052349 filed at the European Patent Office on Apr. 23, 2014.
UK Intellectual Property Search Report dated Nov. 26, 2011 for priority application GB 1116457.
UK Intellectual Property Examination Report dated Jan. 14, 2014 for priority application GB 1116457.1.
International Search Report and Written Opinion dated Dec. 13, 2012 for PCT/GB2012/052349.

* cited by examiner

FUEL CELL SYSTEM

REFERENCE TO RELATED APPLICATIONS

This application is a National Stage of International Application No. PCT/GB2012/052349, filed on Sep. 21, 2012, which claims priority to GB Application No. 1116457.1, filed on Sep. 23, 2011, the disclosures of which are incorporated by reference in their entirety.

The present invention relates to fuel cells and in particular to proton-exchange membrane type fuel cells in which hydrogen is supplied to the anode side of the fuel cell, oxygen is supplied to the cathode side of the fuel cell and water by-product is produced at and removed from the cathode side of the fuel cell.

Such fuel cells typically comprise a proton exchange membrane (PEM) sandwiched between two porous electrodes, together comprising a membrane-electrode assembly (MEA). The MEA itself is conventionally sandwiched between: (i) a cathode diffusion structure having a first face adjacent to the cathode face of the MEA and (ii) an anode diffusion structure having a first face adjacent the anode face of the MEA. The second face of the anode diffusion structure contacts an anode fluid flow field plate for current collection and for distributing hydrogen to the second face of the anode diffusion structure. The second face of the cathode diffusion structure contacts a cathode fluid flow field plate for current collection, for distributing oxygen to the second face of the cathode diffusion structure, and for extracting excess water from the MEA. A plurality of such fuel cells are conventionally layered in a series configuration to form a fuel cell stack.

A fuel cell stack may be conveniently disposed within a housing or other supporting frame or structure which may also provide support and/or protection for other components of a fuel cell system. The other components of the fuel cell system may include various elements, such as one or more fans for forced ventilation of the cathode diffusion structure to deliver oxygen, a fuel delivery system, fuel and air flow monitoring systems, a temperature monitoring system, a cell voltage monitoring system, and electronics for providing control functions to the fuel cell stack.

One additional component commonly used in a fuel cell system is a hydrogen detector for detecting hydrogen leaks from the fuel cell stack or from a supporting fuel delivery system. A hydrogen leak detector can be an important feature for safe operation of a fuel cell stack but adds cost and complexity to the construction of the fuel cell system. Further, a hydrogen leak detector may successfully detect the presence of a hydrogen leak, but does not actively assist in dealing with escaped gas; rather the leak detector is conventionally used to trigger an alarm condition and/or to shut down the fuel cell and/or fuel supply.

It is an object of the present invention to provide an improved system for detecting hydrogen leaks in a fuel cell system.

According to one aspect, the present invention provides a fuel cell system comprising: a fuel cell including at least one cathode and a cathode conduit for passage of oxidant gas through or over the cathode; a housing containing said fuel cell and defining a plenum around the fuel cell; a ventilation system configured to force air from the plenum into the cathode conduit; and a control system configured to monitor the fuel cell voltage and to detect a drop in voltage attributable to the presence of hydrogen in the cathode conduit.

The housing may define a plenum confining all faces of the fuel cell except a cathode exhaust face thereof, the cathode exhaust face including a downstream end of the cathode conduit. The ventilation system may comprise a fan disposed in a wall of the housing configured to blow air into the plenum. The housing may be configured such that the primary exit path for air in the plenum is via the cathode conduit. The system may include a plurality of fuel cells formed into one or more stacks within said housing. The control system may comprise: a cell voltage monitoring system for determining the actual voltage of the fuel cell or of one or more cells in said fuel cell stack; a processor for receiving inputs indicative of the operating conditions of the fuel cell or fuel cell stack and determining therefrom an expected voltage of the one or more fuel cells being monitored; and a comparator for determining whether the difference between the actual voltage and the expected voltage exceeds a predetermined threshold indicative of a predetermined level of hydrogen in the cathode conduit. The housing may comprise at least one air inlet for passage of ambient air into the plenum, the system further including a fan disposed downstream of the cathode conduit and configured to pull air from the plenum into the cathode conduit and exhaust the air therefrom.

Figure 2:
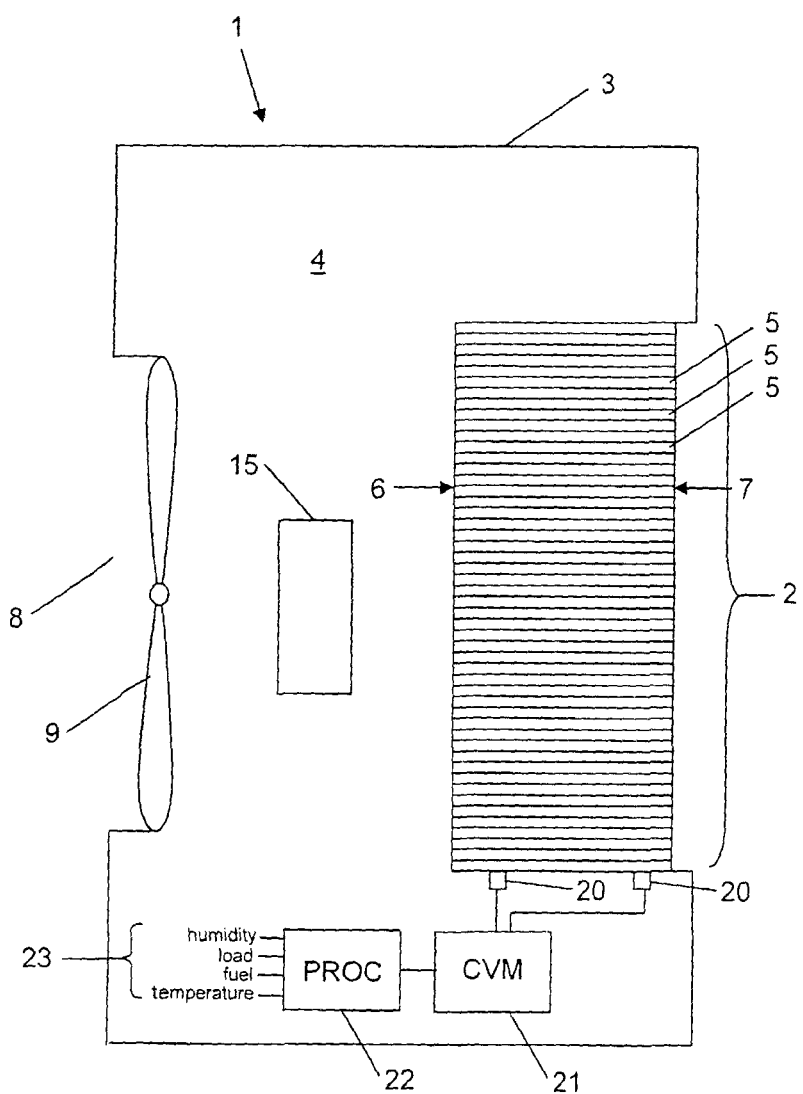

Embodiments of the present invention will now be described by way of example and with reference to the accompanying drawings in which:

FIG. 1 shows a fuel cell system comprising a fuel cell stack disposed within a housing; and FIG. 2 shows a schematic diagram of the functional components of a hydrogen leak detection system incorporated into the fuel cell system of FIG. 1.

With reference to FIG. 1, a fuel cell system 1 comprises a fuel cell stack 2 disposed within a housing 3. The housing 3 contains the fuel cell stack 2 and defines an air space or plenum 4 around the fuel cell stack. The fuel cell stack 2 includes a plurality of cells 5 layered together in a conventional stack configuration so that the output voltages of successive cells 5 in the stack 2 can be coupled in series to provide a stack output of any desired voltage. The fuel cell stack 2 may be of conventional construction to include anode channels for delivering fuel to the anode sides of membrane-electrode assemblies in the stack, and cathode channels for delivering oxidant to the cathode sides of the membrane-electrode assemblies in the stack. The fuel cell stack 2 may be of the open cathode type such that oxidant is delivered to the cathode side of the MEA by forced ventilation at substantially atmospheric pressure through the cathode channels. The stack 2 comprises a number of faces including a cathode inlet face 6 into which cathode air is blown and a cathode exhaust face 7 from which cathode air is expelled. The housing 3 preferably does not entirely enclose the fuel cell 2, but leaves the cathode exhaust face 7 exposed to ambient air on the exterior of the housing 4 as shown in FIG. 1. The housing may be sealed to the edges of the stack 2 to prevent air from passing around the edge of the stack.

The housing 3 includes an aperture 8 and an associated fan 9 therein which, during operation of the fuel cell stack, is configured to force air into the plenum 4 thereby slightly raising the pressure of the air in the plenum so that it is forced into the cathode inlet face 6, passes through cathode conduits in the fuel cell stack 2 and is expelled via the cathode exhaust face 7. While the air is conveyed through the cathode conduits, it provides oxidant gas that passes through or over the cathode surfaces of the fuel cells in the stack, and carries the water by-product out of the cathode to the exhaust face 7. The fan 9 may also be positioned to blow the air over any supporting electronics 15 within the housing, which serves to cool circuit devices and thereby to preheat the air passing into the fuel cell. Other forms of ventilation system to generate appropriate air flows may be used, e.g. blowers, compressors or the like. The expression "fan" is intended to encompass all such generators of air flows.

Fuel cell stacks are typically made from tens or hundreds of layers including membrane-electrode assemblies, diffusion layers, fluid flow plates and gaskets sealing the various layers. Imperfect sealing of the layers, or degradation of materials used over time, can result in escape of hydrogen gas. Therefore, in many applications, it is desirable to monitor for escape of hydrogen gas from the stack 2. In the design of FIG. 1, it will be recognised that an escape of hydrogen from the stack 2 will primarily result in the hydrogen leaking into the plenum 4. In addition, any hydrogen escape from a supporting fuel delivery system also contained in the housing 3 will result in the hydrogen leaking into the plenum 4. The inventors have recognised that it is not necessary to provide a separate hydrogen detector within the plenum 4 because the fuel cell stack itself, in conjunction with a suitable control system, may be used to detect any hydrogen leak.

Any hydrogen leaking into the plenum 4 will be force-ventilated through the cathode inlet face 6 and into the cathode conduits of the fuel cell stack. Hydrogen present at the cathode face of the MEA of a fuel cell results in a drop in voltage and loss of efficiency of the fuel cell. This voltage drop can be detected by careful monitoring of the fuel cell using a control system as described below. In addition, a hydrogen leak in the close vicinity of the inlet to the housing, but not necessarily within the housing, could also be drawn in to the housing by the fan 9 and result in the hydrogen being force-ventilated through the cathode conduits.

As shown in FIG. 2, the fuel cell stack 2 includes at least two cell voltage monitoring terminals 20 which can be used to detect the voltage of a cell or a series of cells or even the whole stack. Fuel cells may have cell voltage monitoring terminals on many cells in the stack, or on selected groups of cells connected in series. The cell or stack voltage(s) is/are passed to a cell voltage monitoring circuit 21 and logged. A processor 22 monitors the fuel cell voltage or voltages and is configured to detect a drop in cell or stack voltage attributable to the presence of hydrogen in the cathode conduit.

To do this, the processor 22 may operate to detect an unexpected change in cell or stack voltage output and trigger a detection condition in the event of an unexpected fall in cell or stack voltage. Alternatively, the processor may operate to compare an actual cell or stack voltage output with an expected cell or stack voltage output, given prevailing operating conditions for the cell or stack. To do this, the processor 22 may be provided with a plurality of inputs 23 corresponding to sensed operating conditions of the fuel cell, cells or stack. These operating conditions may include such parameters as temperature, fuel flow, electrical load, cathode output humidity, local ambient humidity, fuel cell age, atmospheric air pressure, recent operational history etc. The processor may use the inputs to determine an operating condition which can be used to determine an expected voltage by way of an appropriate algorithm or look-up table. The processor may include a comparator for determining whether the difference between the actual voltage measured and the expected voltage derived from the operating conditions of the fuel cell exceeds a certain amount or threshold that would be indicative of a predetermined level of hydrogen in the cathode conduit, e.g. arising from a hydrogen leak into the plenum. The extent to which the processor requires knowledge of some or all of the operating conditions identified above will depend on the sensitivity of hydrogen detection required. The cathode of a fuel cell can be extremely sensitive to the presence of hydrogen such that a substantial drop in the cell voltage, possibly even to near-zero, can occur with only a few parts per million (ppm) of hydrogen present in the cathode air flow.

A further benefit of the closed configuration of the housing 3 and ventilation system of FIGS. 1 and 2 for hydrogen detection is that any leaking hydrogen that does escape, and that is detected by the fuel cell, will be to some extent depleted by the reaction taking place on the cathode side of the PEM. This will be exhausted safely as water from the cathode exhaust. Thus, not only can the leaking hydrogen be conveniently detected, but it can be partially or fully rendered harmless by the fuel cell itself.

Various changes to the exemplary fuel cell system described in connection with FIGS. 1 and 2 could be made.

The cathode exhaust face 7 of the stack 2 could also be contained within the housing 3 but be directly coupled to the exterior of the housing by a suitable ventilation duct or other air flow conduit.

The fan 9 could be positioned on or adjacent to the downstream cathode exhaust face 7 of the fuel cell stack and be arranged to pull air from the plenum 4 via the cathode conduit. In such a configuration, the aperture 8 in the housing 3 would preferably be sized to ensure that the exhaust fan is strong enough to maintain a slight negative pressure in the plenum sufficient to ensure that sufficient hydrogen from any significant escape will be drawn through the cathode conduit. The aperture 8 could comprise a number of apertures distributed around the housing for smoother air flow.

It is preferable that the housing 3 is relatively airtight to ensure that hydrogen leaking from the fuel cell stack 2 is captured within the housing and is then forced into the cathode conduits of the fuel cell. However, it will be understood that complete airtightness is not essential. The degree of closure of the housing required will be determined in part by such factors as the strength of the fan and the airflows necessary through the stack and the sensitivity of the stack to detecting small concentrations of hydrogen in a larger air flow. Thus, all that is required is that the housing 3 offers sufficient containment to the plenum 4 to ensure that a sufficient proportion of any hydrogen leaking from the stack 2 is captured for forced ventilation through the cathode conduit for reliable detection. In a preferred arrangement, the housing and ventilation system is configured such that the primary (i.e. dominant) exit path for air in the plenum 4 is via the cathode conduit.

The housing 3 can contain any size of fuel cell or fuel cell stack and multiple stacks could share a common housing.

Other embodiments are intentionally within the scope of the accompanying claims.

The invention claimed is:

1. A fuel cell system comprising:
 a fuel cell including at least one cathode and a cathode conduit for passage of oxidant gas through or over the cathode;
 a housing containing said fuel cell and defining a plenum around the fuel cell;
 a ventilation system configured to force air from the plenum into the cathode conduit;
 a control system configured to monitor the fuel cell voltage and to detect a drop in voltage attributable to the presence of hydrogen in the cathode conduit; and wherein the housing defines the plenum confining all faces of the fuel cell except a cathode exhaust face thereof, the cathode exhaust face including a downstream end of the cathode conduit.

2. The fuel cell system of claim 1 in which the ventilation system comprises a fan disposed in a wall of the housing configured to blow air into the plenum.

3. The fuel cell system of claim 2 in which the housing is configured such that a primary exit path for air in the plenum is via the cathode conduit.

4. The fuel cell system of claim 1 comprising a plurality of said fuel cells formed into one or more stacks within said housing.

5. The fuel cell system of claim 1 or claim 4 in which the control system comprises:
- a cell voltage monitoring system for determining the actual voltage of the fuel cell or of one or more cells in said fuel cell stack;
- a processor for receiving inputs indicative of one or more operating conditions of the fuel cell or fuel cell stack and determining therefrom an expected voltage of the one or more fuel cells being monitored; and
- a comparator for determining whether the difference between the actual voltage and the expected voltage exceeds a predetermined threshold indicative of a predetermined level of hydrogen in the cathode conduit.

6. The fuel cell system of claim 1 in which the housing comprises at least one air inlet for passage of ambient air into the plenum, the system further including a fan disposed downstream of the cathode conduit and configured to pull air from the plenum into the cathode conduit and exhaust the air therefrom.

7. The fuel cell system of claim 1 in which the control system is configured to sense one or more operating conditions of the fuel cell, or of plural such fuel cells in a fuel cell stack, and to detect a fall in cell or stack voltage that is unexpected, based on said one or more operating conditions.

8. The fuel cell system of claim 7 in which the one or more operating conditions comprise fuel flow.

9. The fuel cell system of claim 7 in which the one or more operating conditions comprise electrical load.

10. The fuel cell system of claim 7 in which the one or more operating conditions comprise cathode output humidity.

11. The fuel cell system of claim 7 in which the one or more operating conditions comprise local ambient humidity.

12. The fuel cell system of claim 7 in which the one or more operating conditions comprise fuel cell age.

13. The fuel cell system of claim 7 in which the one or more operating conditions comprise atmospheric air pressure.

14. The fuel cell system of claim 7 in which the one or more operating conditions comprise temperature.

15. The fuel cell system of claim 7 in which the one or more operating conditions comprise recent operational history.

16. The fuel cell system of claim 1 in which the control system is configured to sense one or more operating conditions of the fuel cell, or of plural such fuel cells in a fuel cell stack, and includes a processor configured to compare an actual cell or stack voltage with an expected cell or stack voltage given the one or more operating conditions for the cell or stack.

17. The fuel cell system of claim 16 in which the processor further includes an algorithm or look-up table to provide the expected cell or stack voltage.

18. The fuel cell system of claim 16 in which the processor includes a comparator for determining whether the difference between the actual cell or stack voltage and the expected cell or stack voltage exceeds a threshold indicative of a predetermined level of hydrogen in the cathode conduit.

19. The fuel cell system of claim 1 in which the plenum defines an airspace confining all faces of the fuel cell except the cathode exhaust face thereof.

20. The fuel cell system of claim 1 in which the fuel cell unit has a cathode inlet face including an upstream end of the cathode conduit.

* * * * *